Figure 7:
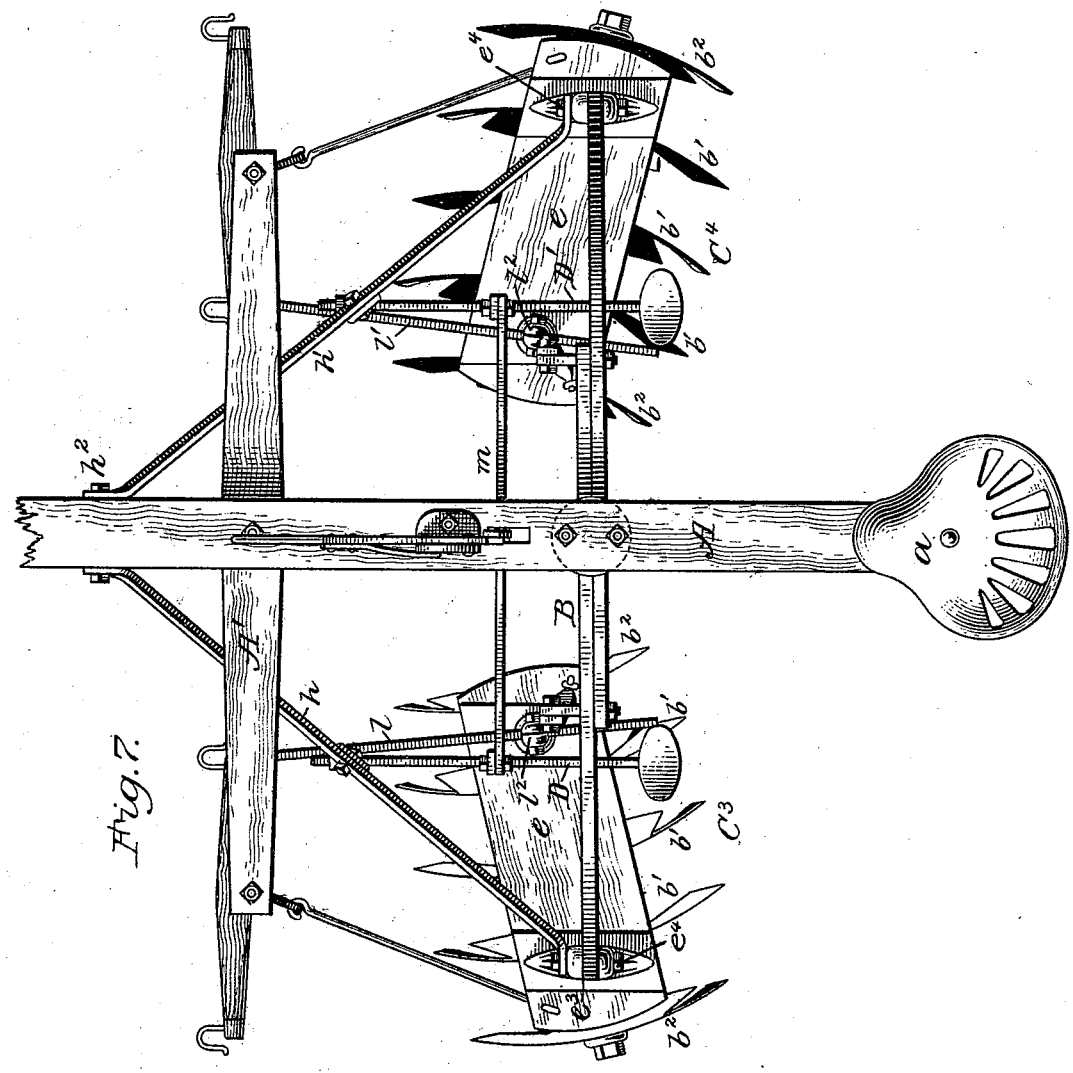

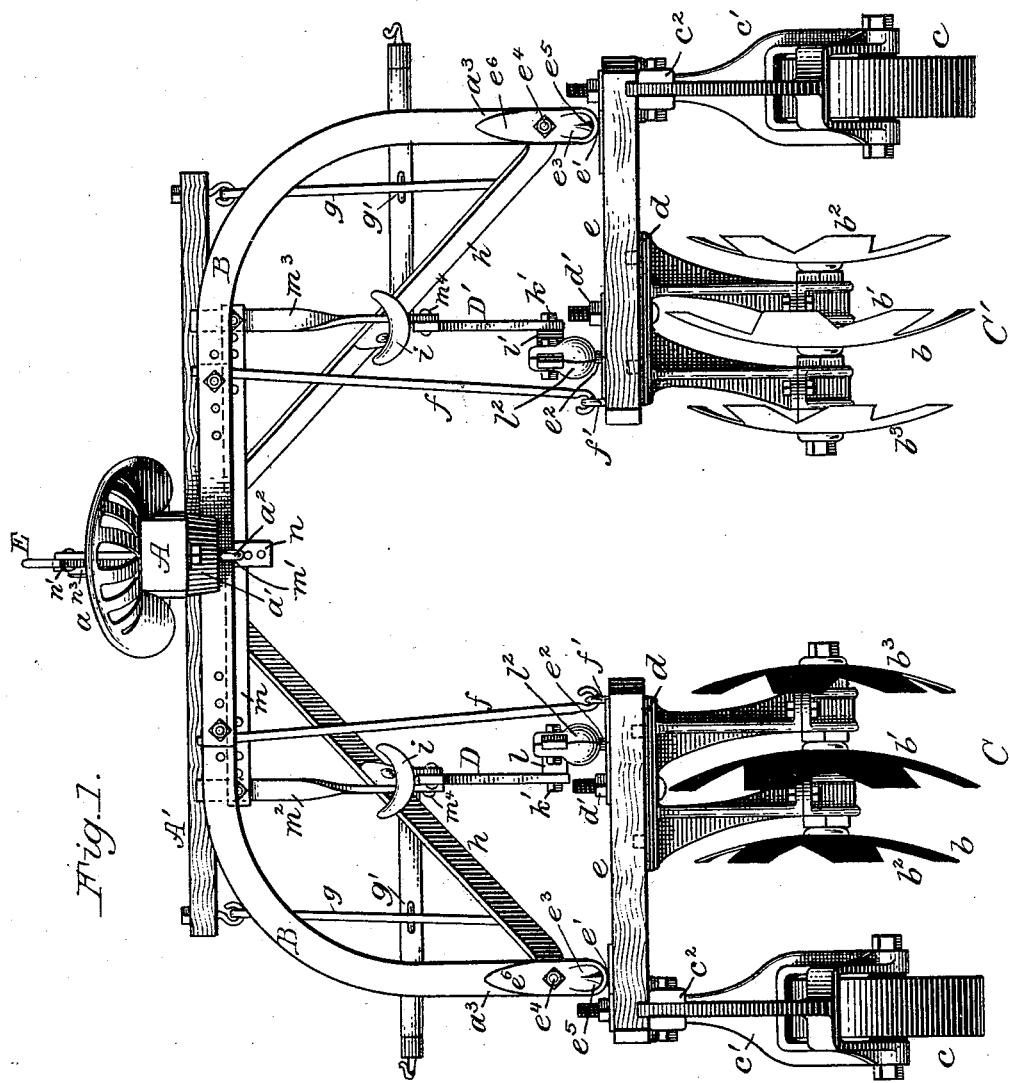

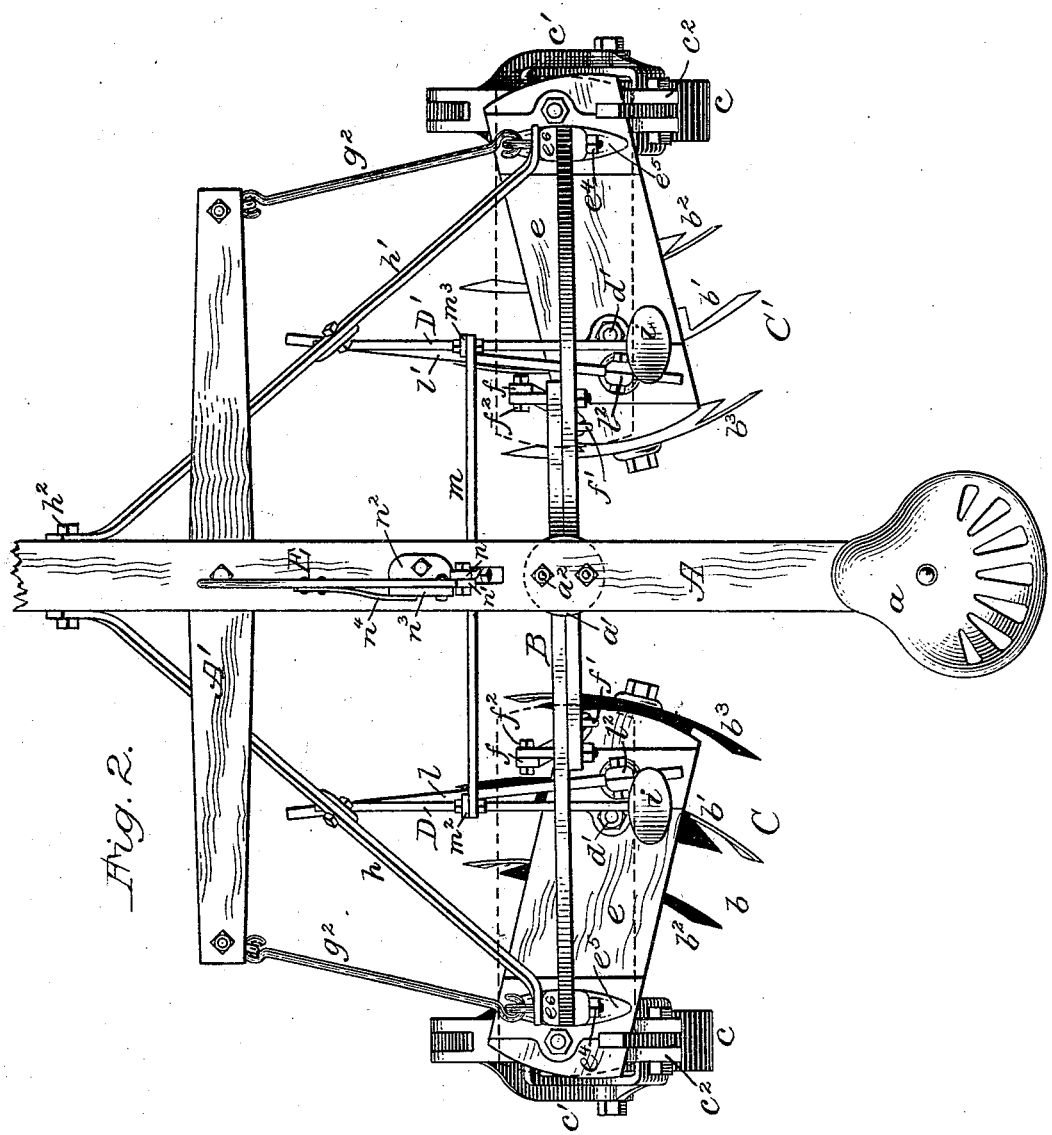

(No Model.) 8 Sheets—Sheet 3.
G. M. CLARK.
STRADDLE ROW CULTIVATOR.
No. 514,209. Patented Feb. 6, 1894.
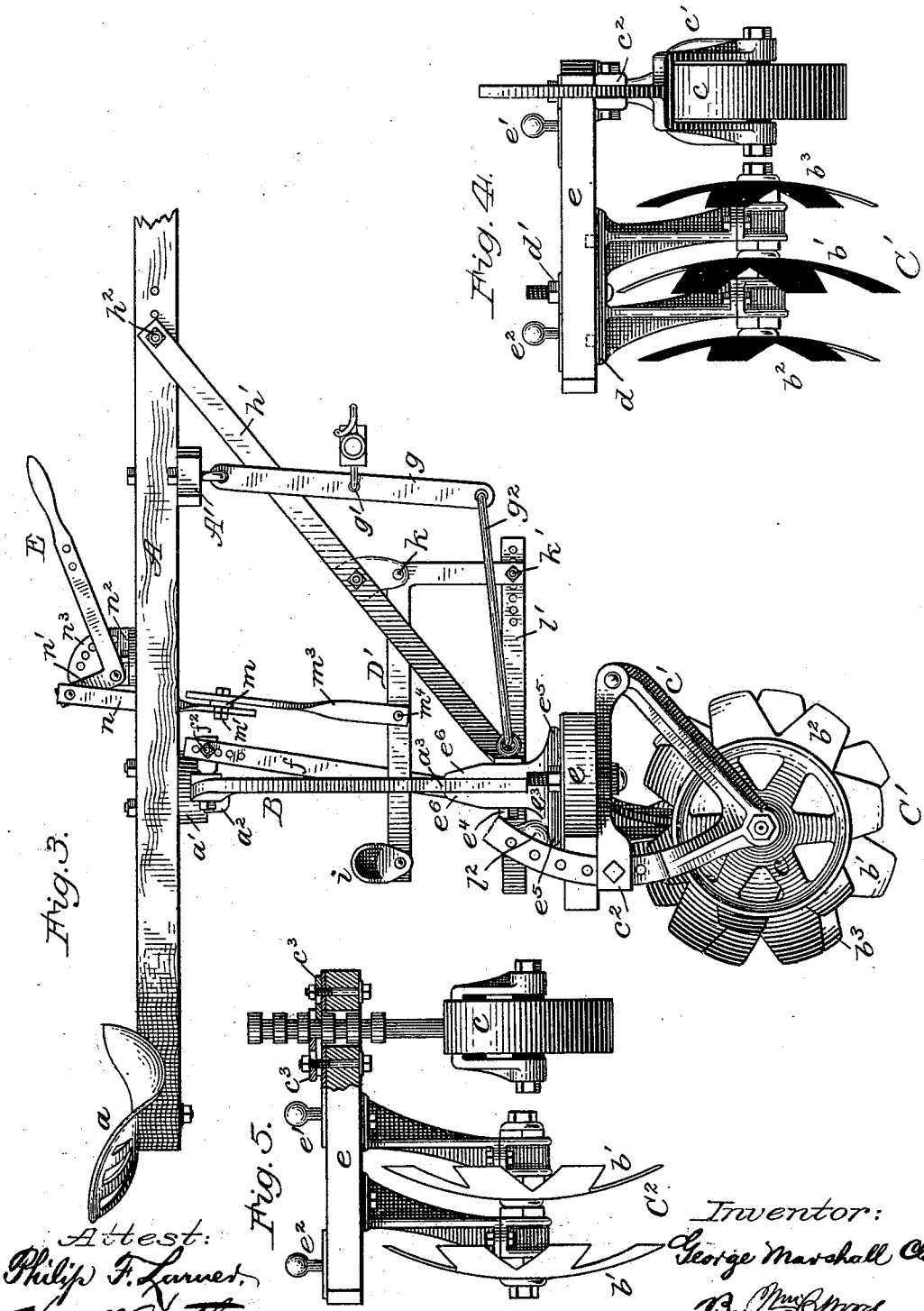
Attest:
Philip F. Larner
Howell Bartle
Inventor:
George Marshall Clark.
By [signature]
Attorney (No Model.) 8 Sheets—Sheet 4.
G. M. CLARK.
STRADDLE ROW CULTIVATOR.
No. 514,209. Patented Feb. 6, 1894.
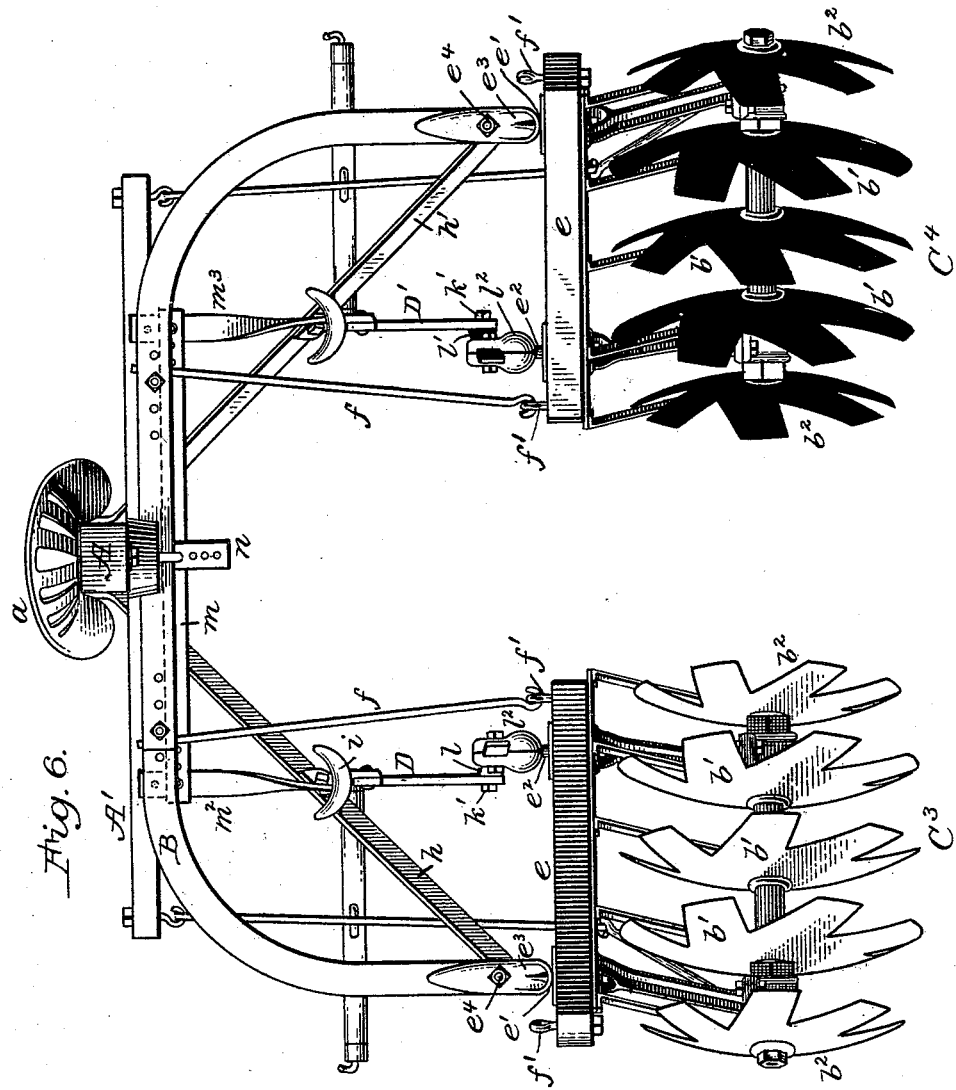
Attest:
Philip F. Larner
Norwell Little
Inventor:
George Marshall Clark
By McC__
Attorney (No Model.)  G. M. CLARK.  8 Sheets—Sheet 5.
STRADDLE ROW CULTIVATOR.

No. 514,209.  Patented Feb. 6, 1894.

Attest:
Philip F. Larner
Howell Bartle

Inventor:
George Marshall Clark
By Mun & Mead
Attorney

THE NATIONAL LITHOGRAPHING COMPANY,
WASHINGTON, D. C.

(No Model.) 8 Sheets—Sheet 6.
G. M. CLARK.
STRADDLE ROW CULTIVATOR.
No. 514,209. Patented Feb. 6, 1894.
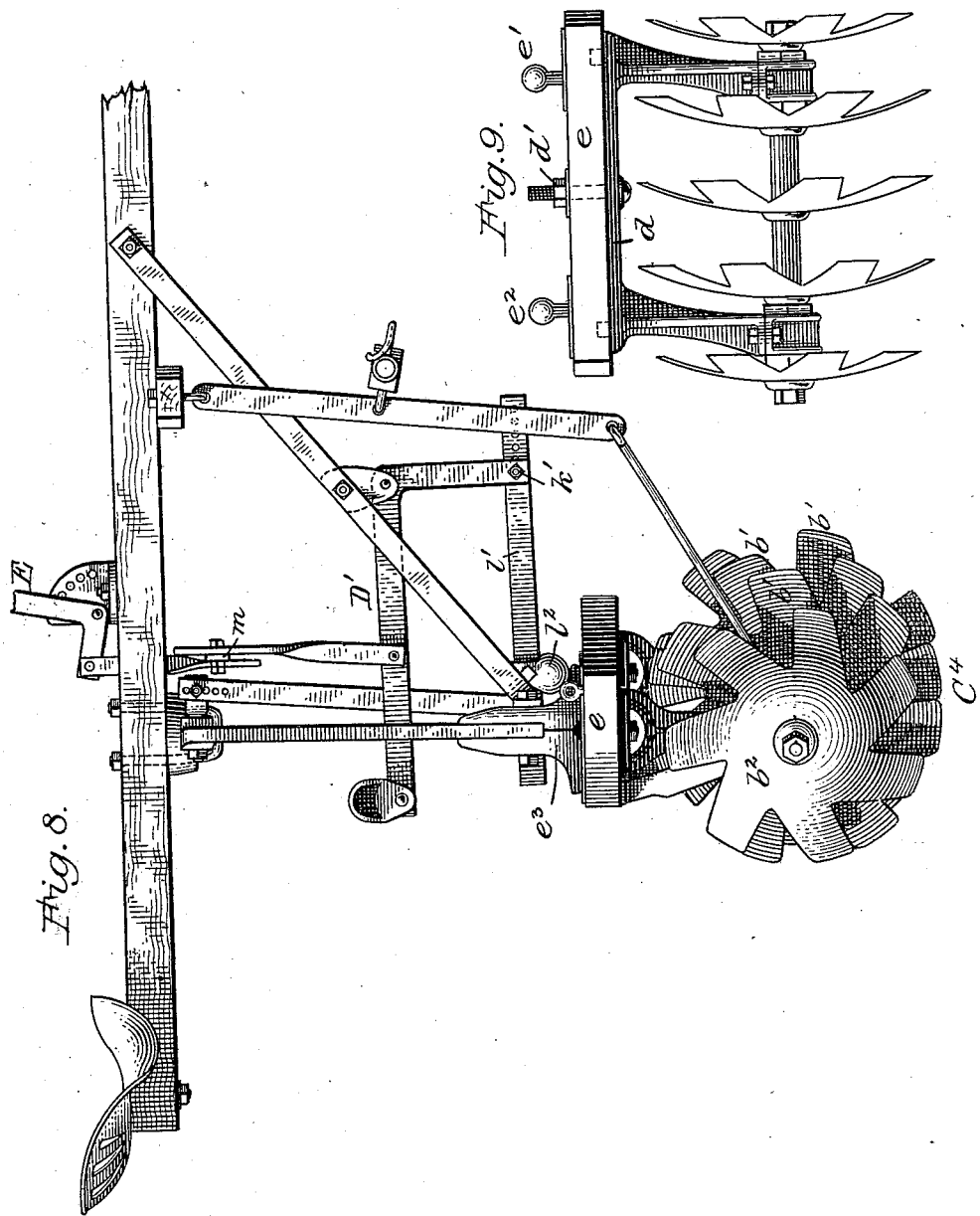
Attest:
Philip F. Larner
Howell Battle
Inventor:
George Marshall Clark
By Wm C Wood
Attorney (No Model.) 8 Sheets—Sheet 7.
G. M. CLARK.
STRADDLE ROW CULTIVATOR.
No. 514,209. Patented Feb. 6, 1894.
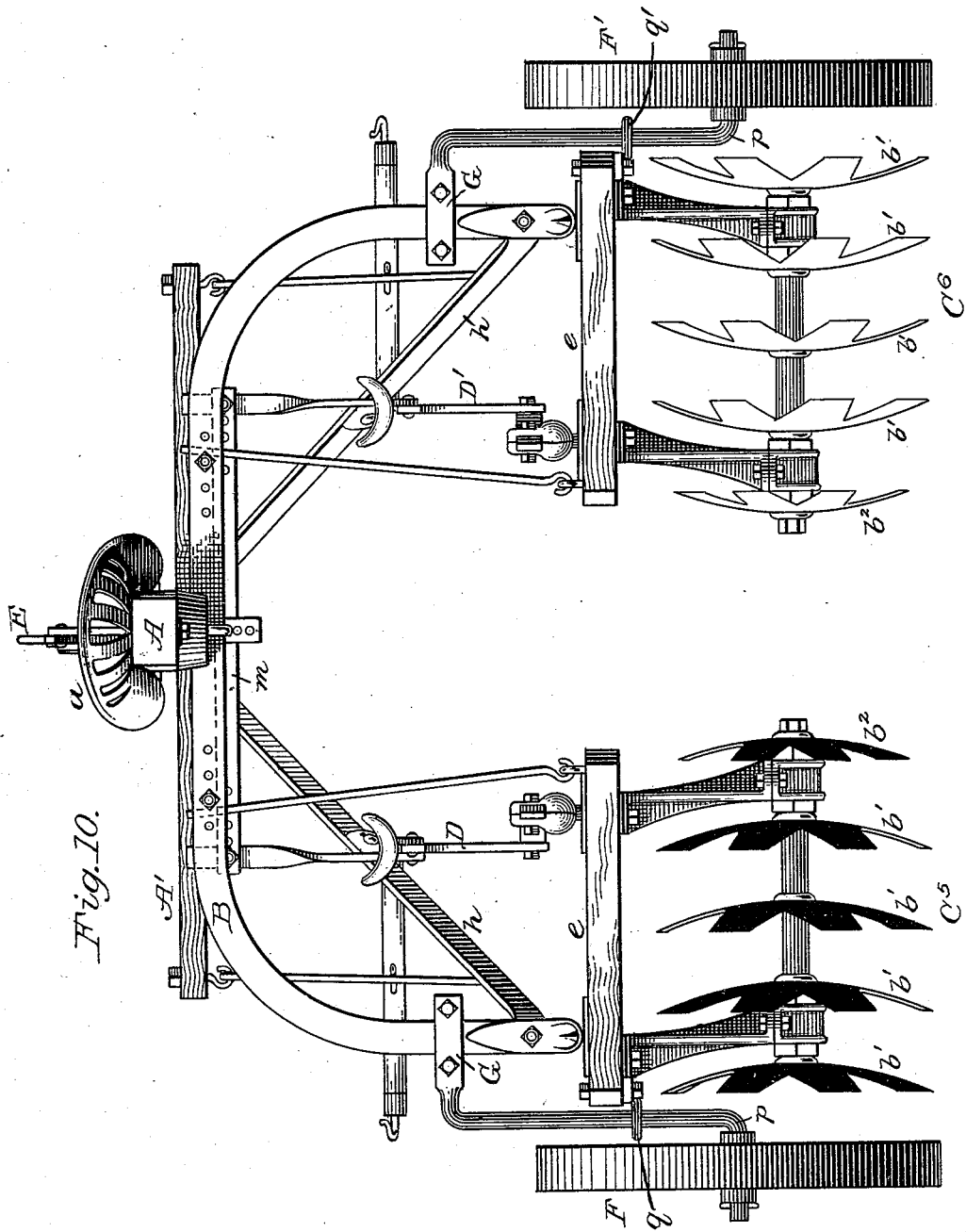
Attest:
Philip F. Larner
Howell Battle
Inventor:
George Marshall Clark
By [signature]
Attorney (No Model.)  
8 Sheets—Sheet 8.
G. M. CLARK.
STRADDLE ROW CULTIVATOR.
No. 514,209. Patented Feb. 6, 1894.
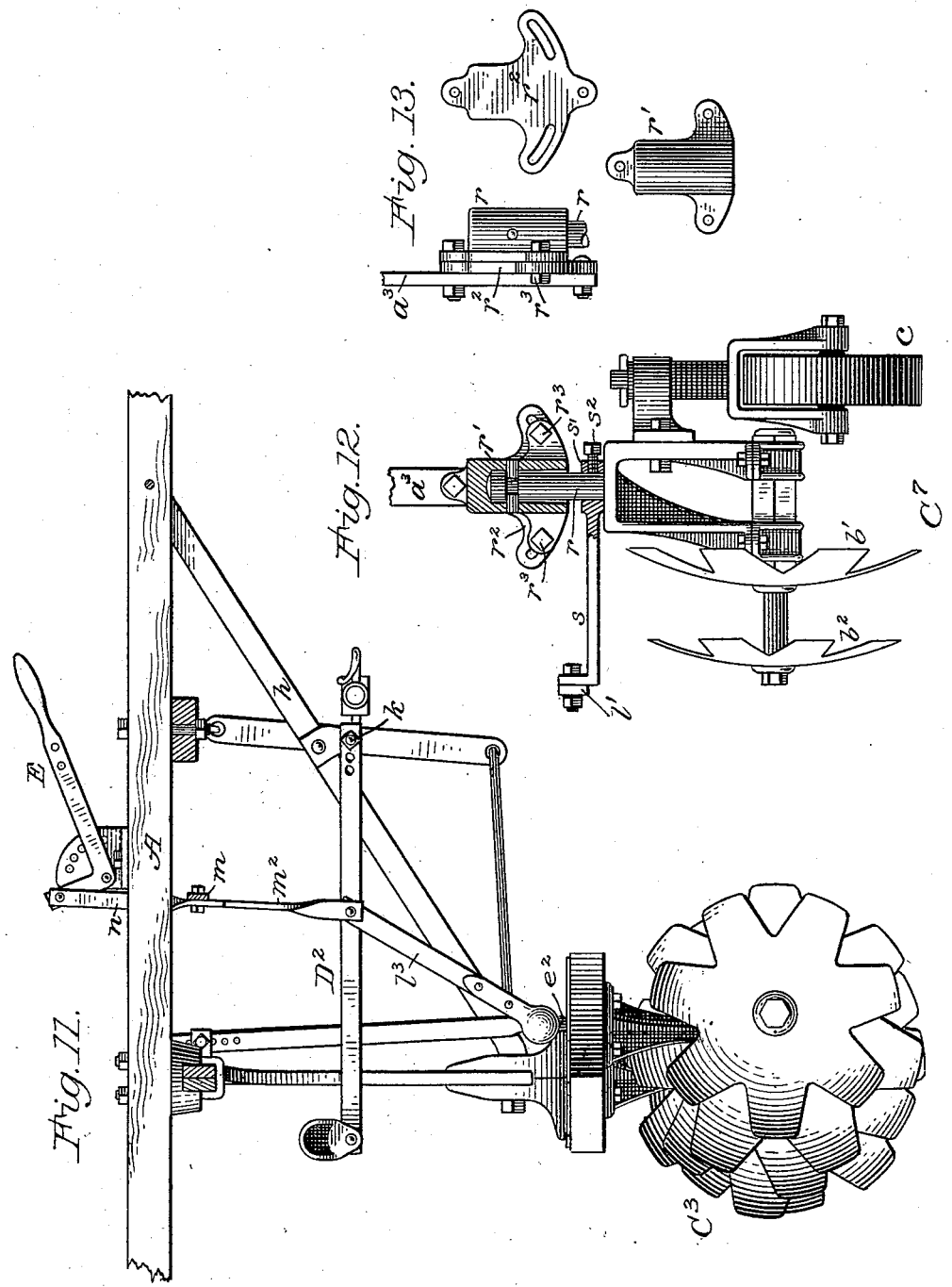
Attest:  
Philip F. Larner  
Howell Bartle
Inventor:  
George Marshall Clark  
By _____ Attorney
THE NATIONAL LITHOGRAPHING COMPANY,  
WASHINGTON, D. C.

UNITED STATES PATENT OFFICE.

GEORGE MARSHALL CLARK, OF HIGGANUM, CONNECTICUT.

STRADDLE-ROW CULTIVATOR.

SPECIFICATION forming part of Letters Patent No. 514,209, dated February 6, 1894.

Application filed November 1, 1892. Serial No. 450,617. (No model.)

*To all whom it may concern:*

Be it known that I, GEORGE MARSHALL CLARK, of Higganum, in the township of Haddam, county of Middlesex, and State of Connecticut, have invented certain new and useful Improvements in Straddle-Row Cultivators; and I do hereby declare that the following specification, taken in connection with the drawings furnished and forming a part of the same, is a clear, true, and complete description of my invention.

My said improvements, pertain generally to that extensive class of straddle row cultivators, in which rotary concavo convex disks are employed, whether said disks are circular edged, or bladed and solid, or composite in their structure; and my said improvements are applicable to that variety of such cultivators, as embody disks which are relied upon for performing the sole carrying duty, and also to that other variety, wherein the disks are relieved from, or at least supplemented with respect of the carrying duty, as by wheels which perform that function.

That portion of my invention which is most general in its application, consists in part of a novel combination of treadle or foot levers, (accessible to the feet of the operator, while in his seat on the machine,) with disks, disk gangs, and gang frames, connected at, and to the legs of an arched, or inverted U-shaped frame, the foot levers being coupled at their working ends, by means of bars or links, with the free ends of the gang frames, the latter being either permanently set or arranged with reference to an outward, or to an inward, displacement of soil, or capable of reversal. However the gangs may be set for service, if the disks perform carrying duty, in whole or in part, the operator by working his feet, can promptly and positively control the machine in its lateral movements with reference to a central line; as, for instance, so as to enable a proper working of the soil at the two sides of a row of young corn. For securing the best results, the two foot levers are coupled together by means of pendent links, and a rocking lever, and the latter is controlled as to vertical adjustment, which enables the disk gangs to be set on lines at right angles to the line of draft, as when performing carrying duty, with little or no working of the soil.

The simplicity of this portion of my invention, involves substantial economy in construction, with strength and durability, as well as positive and reliable operation, in promptly effecting the various movements of the disk gangs with ease and facility, whether the disks carry the entire machine, (as well as the driver,) or are relieved from all, or a part of the carrying duty. If the disks perform no carrying duty, the two gangs may be controlled separately by the appropriate foot of the operator; or they may be coupled together, as described, so that when either gang is inclined, as by depressing its foot lever, the other gang has its inclination correspondingly lessened, its foot lever being then elevated, and having no foot pressure applied thereto. With the two foot levers coupled together, the working strains on the gangs are offset or balanced, and this is specially important when the disks perform carrying duty, because it relieves the feet of the operator from heavy continuous strains, and it also affords desirable promptness in operation, when the disks perform no carrying duty; although in the latter case, should the foot levers be disconnected, but little exertion on the part of the operator, will be needed for maintaining the disk gangs at proper working inclinations, and when operating with outward displacement, each gang if permitted, will be promptly dragged into a non inclined position as an incident to the forward movement of the machine. I have also so organized the disk gangs, their gang frames, and the arched main frame, that the free or swinging ends may be either elevated, or depressed, all the connections being flexible, within proper limits, and capable of varied adjustment for meeting many, if not all of, the requirements incident to the use of such machines. I have also organized in the same gangs, co-operating carrying wheels, and soil working disks, so that each will perform a part of the carrying duty, and being on the same swiveled gang frames on which the disks are carried, the wheels promptly respond to the several variations in inclination to which the disks must be subjected, whether said wheels have axes which are always in line with the axes of the disks in the complex gangs, or have self adjusting axes, as with caster wheels; and in either case, provision has been made for any desired adjustment of the tread of the carrying wheels, with relation to the lower edges of the disks in the gang therewith; so that for instance, the disks may occupy a lower plane than the wheels, thus especially adapting this form of my machine, to the working of such crops as "listed corn." I have also devised gangs of disks bladed which are specially adapted for safely working at one or both of their ends in proximity to rows of some kinds of growing plants, said gangs having centrally located disks, of a diameter large enough to secure cutting to the greatest depth desired, and also disks at the end or ends of the gangs, which are smaller in diameter, so that they will cut to lesser depths adjacent to the standing plants and their roots. These bladed disk gangs are swiveled to the legs of the arched frame, and so easily controlled by foot levers, that the gangs may be swung to and fro and the blades of the disks caused to operate after the manner of hoes. In some cases, as in wet soil, it is however desirable to make specially deep cuts in the soil alongside of planted rows, but at a safe distance therefrom, in which case the gangs are organized as hereinbefore described, but they have, in accordance with my invention as disclosed in a contemporaneous application for patent filed by me, any number of disks say fourteen or sixteen inches in diameter, and one or two larger end disks eighteen, twenty, or twenty-four inches in diameter, thus providing for deep and heavy working of the soil safely adjacent to the growing plants. In still other cases, the gangs should embody disks which are uniform in diameter, those portions of my invention which are not dependent upon the particular character of the disk gangs being equally valuable and effective in all cases.

After describing my several improvements, as embodied by me in several machines more or less varied in matters of detail, and with respect of performing certain special lines of duty, the features deemed novel, will be duly specified in the several clauses of claim hereunto annexed.

Referring to the drawings: Figure 1, in rear elevation illustrates a machine having complex gangs, and embodying all of my improvements, said machine having been organized with special reference to operating in fields of listed corn, but with the gangs set, as when moving to and from a field. Fig. 2, illustrates the same in plan view, with the gangs adjusted for service, and so as to operate for an outward displacement of soil, the position of the gangs as when moving on the road, being indicated in dotted lines. Fig. 3, illustrates the same, in side elevation. Fig. 4, in rear elevation, illustrates one of the complex gangs, and its frame, the disks being set for an inward displacement of soil. Fig. 5, in rear elevation, illustrates a gang frame having a carrying wheel, and two disks uniform in diameter. Fig. 6, illustrates in rear elevation, another of my machines with disk gangs which are wholly relied upon for carrying duty. Fig. 7, is a plan view of the machine Fig. 6. Fig. 8, is a side elevation of the same. Fig. 9, is a rear elevation of a gang of disks similar to those in Fig. 7, but reversible as in Fig. 1. Fig. 10, in rear elevation, illustrates one of my machines in which the disk gangs are wholly relieved from carrying duty. Fig. 11, illustrates a modification of the foot lever, and its link connection with the gang, said link being coupled to the lever, between its foot piece and its inner pivoted end. Fig. 12, illustrates one of my complex gangs in a modified form, centrally coupled to one of the legs of an arched frame. Fig. 13, in several views, illustrates the socket bearing in which the central spindle of the gang frame of Fig. 12, is carried.

I will first describe the machine, illustrated in Figs. 1 to 4 inclusive. The pole A, carries at its rear end, a driver's seat $a$, and said pole is mounted rigidly on the arched (or ∩-shaped) main frame B, by means of a clamping block $a'$, and a staple bolt $a^2$. The arched frame is constructed as heretofore, in two parts, extensible with reference to each other, and to the pole, as by means of numerous registering bolt holes, and clamping bolts, the two legs $a^3$, $a^3$, of the frame, being connected at their lower ends to the disk gangs, however these latter may be constructed and organized. The complex gangs C, and C', in this machine, are novel, in that they each include one or more soil working disks as at $b$, and carrying wheels $c$, organized in the same gang frame. The three disks $b'$, $b^2$, $b^3$, in each gang here shown, are mounted on a suitable axle, having journal boxes in standards, which may be integral with, or secured to the under side of a plate $d$, provided with a central hole, and with dowel studs on its top, so that the disk gangs may be secured to the gang head planks $e$, between its center and its inner end, in such a manner, that by loosening a bolt $d'$, the dowel studs will be freed from the holes provided therefor at the under side of the plank, and thus enable either disk gang to be rotated on its pivot bolt, and set either to effect an outward, or an inward displacement of soil, and then firmly clamped to the head plank, the latter with the means by which the disks and the carrying wheel are united thereto, constituting a gang frame, which with the disks and carrying wheel, constitute a complex gang. The central disk $b'$ in each gang, is larger than either of the end disks $b^2$, $b^3$, and therefore the latter operate at a lesser depth in the soil than the central disk. This variation in the diameters of the disks constitutes a portion of my invention, only in connection with bladed disks, employed in gangs which, as shown, are swiveled to the legs of an arched frame, and are controlled by treadle levers as hereinafter described. The carrying wheel $c$, in this machine, is located at the outer end of the gang head plank, and although it may be fixedly mounted, it is in this case mounted in a transverse vertically adjustable yoke piece $c'$, pivoted or hinged at one end to a base plate secured to the plank, and provided at its other end with numerous holes, a bolt, and locking lugs as at $c^2$. These complex gangs C, and C', are each provided on top of the head plank, with ball headed journals $e'$ and $e^2$, one of which at $e'$, serves as a part of a ball and socket connection at the union of the gang with an appropriate foot or leg $a^3$, of the arched frame, the other parts of said connection, being a ball journal box $e^3$, in two halves, and a clamping bolt $e^4$. Each half of the journal box has a lateral arm $e^5$, for affording a broad free bearing contact with the top of the head plank, each half of the box has also a vertical arm $e^6$, provided on its inner side near the top with a dowel stud, which occupies one of several holes in the leg $a^3$, of the arched frame above the hole therein which is occupied by the clamping bolt $e^4$, thus providing for a firm and reliable rigid union of the box and frame leg, and also for a reliable but flexible union of the gang and gang frame to the leg $a^3$, of the arched frame. The head planks of the gang frames, are also provided with eye bolts as at $f'$, with which the lower ends of extensible vertical supporting links $f$, engage, their upper ends being provided with several bolt holes, one of which in each line, is occupied by a bolt at $f^2$, on a lug which may be a part of a bolt which binds the two parts of the arched frame together. These supporting links $f$, need not be provided with special eye bolts $f'$, it being only necessary that some kind of a link coupling medium should be located at or near the inner end of a gang frame, and hence an eye for the link, may be located upon such adjusting connection as may be used upon the inner ball headed bolt at $e^2$, as will be hereinafter further indicated.

The draft connections of the outer ends of the gangs with the pole A, include an evener bar A', pivotally secured to the under side of the pole, and common to both gangs, and each end of said bar, carries a pendent link $g$, to which a singletree is coupled, as at $g'$, the lower end of said link being connected with a standard or journal box, at the outer end of a gang, by means of a draft link $g^2$. The legs $a^3$, of the main or arched frame, as well shown in Fig. 2, are braced or tied to the pole, by means of forwardly and upwardly inclined tie rods $h$, $h'$, each of which is secured at its foot, by a ball journal box bolt $e^4$, and by a bolt $h^2$, in one of several lateral holes in the pole, although more than one hole is not necessary, as the arched frame is capable of being sprung rearwardly or forwardly.

As thus far described, the organization of the complex gangs, arched frame, pole, and draft connections, is one with which various gangs controlling and adjusting mechanisms may be employed, without departure from certain important portions of my invention, viz.: such as include the combination in each gang, of means for soil working, and a carrying wheel; the disk gangs reversible with relation to the head plank or gang frame, in combination with an arched frame, connected at one of its legs with one end of the gang frame; disk gang frames connected at one end with the legs of the arched frame, and at their other ends connected with said frame by links for maintaining the gangs in a horizontal plane, or in vertically inclined position at desirable angles. In this machine, the confining of the gangs in working position, and their control for varying the working line with reference to a planted row, is accomplished by a novel organization with the gangs and pole, of treadles, or foot levers D, D', having foot pieces $i$, at their rear ends, conveniently accessible to the feet of an operator while occupying the driver's seat $a$. Each treadle or foot lever D or D', in this machine, is suspended from the main frame, and is of the bell crank form, pivoted at $k$, to a lug, secured upon the adjacent brace tie $h$ or $h'$; the pendent working arm of the lever, is pivot bolted at $k'$, to a practically horizontal link or rod $l$, $l'$, which is rendered extensible, by means of several bolt holes, either of which may be occupied by the bolt $k'$. At its rear end, each link $l$, is hinged to a ball box $l^2$, constructed in two parts, for properly engaging with the ball head $e^2$, at or near the inner end of the gang hereinbefore referred to, these ball boxes being the devices (also before referred to), as the ones on which, if desired, eyes may be provided to serve in place of the eye bolts $f'$, for coupling the inner ends of the gangs with the pendent links $f$.

As thus far described, it will be obvious, that if either foot lever should be depressed, the inner end of the appropriate gang would be advanced, and that by then relieving it from foot pressure, the end of the gang would move rearwardly, as an incident of the forward movement of the machine, each gang in that case, being separately controlled by the foot lever. The extensible rod or link $l$ enables the foot lever to control the gang, whether the latter must be pulled forward from a line at right angles to the pole, or from a rearwardly inclined position, to said right angled position, either of said movements of either gang, causing an appropriate lateral movement of the machine as a whole, during its forward movement.

Now for operatively coupling the gangs, so that when either is specially inclined forwardly by depressing a foot lever, the other gang in response thereto will be correspondingly forced rearwardly, both foot levers are connected. This connection is effected by means of a horizontal rocking lever $m$, suspended from beneath the pole and pivoted centrally as at $m'$, and two links $m^2$, $m^3$, pendent from the ends of the rocking lever, and respectively coupled as at $m^4$, with the foot levers D, D'. With both gangs angularly adjusted for service, and capable of being swung to and fro by means of the foot levers, both gangs may be set on a line at right angles to the pole, (as for transit) by shifting the bolts $k'$, forwardly on the link $l$, or $l'$, to an appropriate hole therein. For enabling this variation in the position of the gangs to be accomplished simultaneously, and with ease to the operator while the machine is in motion, the rocking lever $m$, is suspended from the lower end of a link $n$, which extends upwardly through a slot in the pole A, and is coupled to the short arm $n'$, of a bell crank hand lever E, pivoted to a base $n^2$, with a segmental locking plate $n^3$, having holes, or notches with which a spring latch $n^4$, on the hand lever may engage, for holding the lever in any desired position appropriate to the plane occupied by the rocking lever. It will now be seen, that any desired angular position of the two gangs, may be determined by the hand lever, such position being either the normal working, or non working adjustment of the machine, and that the treadles or foot levers, cause the gangs to be moved out of their normal working position, for causing the machine to be laterally deflected during its forward movement. In the machine as shown in Figs. 1, 2 and 3 the disks are so set as to effect an outward displacement of soil, or in other words, to work it away from a row of corn, and therefore the gangs are inclined rearwardly at their inner ends, and the treadle levers and the hand lever, with the several connections, are adjusted in harmony with said inclination.

In Fig. 4, the disks are set so as to operate with an inward displacement of soil, and hence when in normal working position, the inner ends of the gangs are inclined forwardly, and therefore the treadle lever links $l, l'$, are shortened and coupled by means of appropriate holes, and the bolts $k'$, to the pendent arms of the treadle levers. In this case, the depression of either treadle lever, pulls the adjacent gang forwardly, and the other gang is pushed or forced rearwardly with a resulting lateral movement of the machine during its forward movement, as before described. Upon disconnecting the hand lever or bar $m$ from the treadle lever, the latter may be relied upon for freely swinging the gangs to and fro and especially when the weight of the machine is carried upon wheels.

It is believed, that the complete operation of a machine organized as thus far described, will be readily comprehended, because of the detailed description, not only of the functions of the several parts of the machine, but also of their several adjustments, and the stated resultants of the several variations therein.

Inasmuch as I do not restrict certain portions of my invention, either to gangs of disks varied in diameter, or to gangs which are reversible with reference to the arched frame and carrying wheel, I will next describe a complex gang as used by me in one form of my machines having non reversible disks, but otherwise constructed and mounted in the machine substantially as already described. In Fig. 5, such a complex gang $C^2$, is shown, wherein two disks $b'$, of the same size are mounted beneath one end of the gang head plank $e$, and with a carrying wheel $c$, at the other end, but the latter in this case is of the caster variety, having a long shank annularly grooved at intervals, and rendered vertically adjustable by means of forked or slitted plates $c^3$, $c^3$, one overlying the other, and occupying a groove in the shank, and both clamped to the head plank by means of bolts. In this case, the disk gangs are set for effecting an outward displacement of soil. The carrying wheel in this complex gang may be mounted in a pivoted adjustable yoke piece as shown in Figs. 1 to 4 inclusive, it being distinctly understood, that the carrying wheels may be widely varied as to construction and mounting, without departure from that portion of my invention which includes the combination of the carrying wheel and disks in one complex gang, and having a gang frame which is common thereto, and is swiveled or flexibly connected to the legs of the arched frame.

Many of the features of my present invention, being independent of carrying wheels, I will next describe another form of my machines as built and used, and as illustrated in Figs. 6, 7, 8, and 9, wherein the disk gangs not only perform their soil working functions, but are also solely relied upon for carrying duty. In this machine, the disk gangs $c^3$, $c^4$, embody five disks in each gang, those at the ends being smaller, as at $b^2$, than the inside disks $b'$, and the gangs are reversible, with reference to the arched frame, although the gang frame head planks $e$, and the disk gang shaft, and its standards, are or may be permanently connected. Each gang head plank has two ball journals at $e'$ and $e^2$, and they are coupled to the arched frame and to horizontal links, as already described, but in this machine, the gangs are reversed, end for end, after first opening the ball journal boxes $e^3$ and $l^2$ for releasing the balls, and then shifting the balls from box to box. In this machine, the gangs are shown so set as to effect an inward displacement of the soil, and the disk adjusting and controlling portions of the machine, are as in Fig. 1, but it will now be observed, that the links $l, l'$, in this instance are shortened, between the working ends of the treadle levers D, D', at $k'$, and their rear ends, at their connections at $l^2$, with the inner ball journals on top of the gangs. It will also be observed that in this instance the hand lever E is in such a position as to fully depress or lower the rocking lever $m$, and that by raising the latter, the gangs will be swung rearwardly into their inoperative positions as soil working devices; or in other words, into lines at right angles to the line of draft, so that they will then operate only as carrying devices.

Having thus disclosed certain of my machines as organized by me, wherein the soil working disks either do all of the carrying duty, or only a part of said duty, it is to be understood that I do not restrict certain portions of my invention, to those two general forms of machine, because I have so organized machines that the disks do, or need do, no carrying duty whatever, and yet they are exceedingly efficient in many lines of service, wherein it is not desirable to grossly disturb the surface of the soil; as, for instance, in rice fields, or in cutting out weeds and grasses from planted fields. It will be obvious, that for such service the disks should be practically held in suspension, and as they revolve in contact with soil, they must be gyrated to and fro, so as to avoid line cuts too great in length; or to cause the disks to uproot and dislodge masses of weeds or grass; or only to well stir up and disintegrate the surface, as is sometimes specially desirable, when irrigation or overflow sediment has caked or crusted the surface of a previously planted field which requires no sub-working, and which would in fact be injured thereby. This form of my machine, is illustrated in Fig. 10. Having in view some of the lines of service specially indicated, the disks should be alike in size, and more of them in a gang than would be proper for working between planted rows, but having reference to a wider range of service, there are four disks $b'$, of one size, and an end disk $b^2$, smaller than the others in each gang $C^5$, $C^6$, so that when used for effecting an outward displacement of soil, in working the sides of planted rows, it will operate like the machines already described. The treadle levers D, D', and the hand lever E, with their several connections, and the arched frame, the pole, and draft connections, are substantially as in the other machines. The two large carrying wheels F, F', have each a bent axle $p$, provided with a strong clamp G, at its inner end, which is adjustably mounted on the leg of the arched frame, thus providing for suspending the disk gangs at any point with relation to the treads of the wheels, and varying their working contact with the soil. For preventing undue torsional strains on the legs of the arched frame, the link connections as at $h$ and $h'$, with eye bolts as at $q$, $q'$, serve as inclined tie braces, extending from the axle near the wheels forwardly to the sides of the pole.

Now, while treadle levers of the bell crank form as already described, are deemed by me specially effective, and in many ways preferable as compared with any other kind of lever, and although I shall make claim to such levers in appropriate combination, I do not restrict certain portions of my invention, to that type of treadle lever, and desire it to be understood, that with gangs embodying portions of my invention, organized as described, the treadle levers may without departure from certain portions of my invention, be quite widely varied in their form, and in the manner of coupling them to the gangs. As for instance, I have in some forms of my machine, organized straight treadle levers as illustrated in Fig. 11, in such a manner that their link connections with the gangs, operate as knuckle levers, in combination with the treadle levers. In this arrangement, each treadle lever $D^2$, is straight, and extensibly pivoted through one of its several bolt holes at $k$, to a lug on the brace tie $h$, and its outer end is suspended as before described, by means of a pendent link $m^2$, the rocking lever $m$, link $n$, and hand lever E, on the pole A. The connection of the treadle lever with the frame of the reversible gang $C^3$, is however now made, by means of a link $l^3$, pivoted to the treadle lever at the point of its connection with the pendent link $m^2$, and said link $l^3$, at its lower or rear end, is provided with a ball journal box, which is coupled to the adjacent ball journal $e^2$ on the gang frame. This organization, obviously embodies many of the features of my invention already described, including the combination with an arched frame of a gang frame, pivoted to the leg of said frame, and having one end thereof connected not only to a treadle lever for varying the lateral inclination of the gang, but also connected with a rocking lever for simultaneously varying but reversing the inclination of both gangs, and also connected with a hand lever, for simultaneously placing both gangs out of, and into, soil working position.

The advantages accruing from the use of my machines as thus far described, do not wholly depend upon gang frames which are connected at or near one end thereof to the legs of the arched or main frame, although in that system of mounting the gangs, the best results will accrue, because of the extra flexibility afforded while the gangs are in operation.

In Fig. 12, I have illustrated one of my complex gangs $C^7$, which like the complex gang $C^2$, of Fig. 5 has an adjustable caster wheel $c$, as a carrier, and also a pair of disks $b'$, $b^2$, of different diameters as in the gang C of Fig. 1; but this complex gang frame has a vertical spindle $r$, provided with a socket bearing $r'$, having an integral back plate which is secured to the leg $a^3$, of the arched or main frame of the machine, by means of a segmental base plate $r^2$, provided with curved slots, so that the spindle socket may be bolted as at $r^3$, to the base plate, which in turn, is rigidly bolted to the leg of the arched frame. This arrangement, permits the complex gang to swivel freely laterally, and also enables its adjustment, by swinging the socket bearing on its upper bolt, and locking it at any desired inclination, thus enabling an inclined adjustment of the gang on a vertical plane; or in other words, to admit of varying the planes relatively occupied by the lower edges of the disks, and the tread of the carrying wheel, the spindle of which is loose in its bearing, so as to afford desirable lateral movement in its socket bearing, and in a similar manner, desirable flexibility is also afforded at the socket bearing which contains the gang spindle $r$. At the base of the spindle $r$, an inwardly projecting lever or arm $s$, is carried, said lever being provided at $s'$, with a collar which surrounds the spindle, and is adjustably secured thereto, by means of a clamp screw as at $s^2$. The reversibility of a gang frame, is of no consequence, unless the gang be not complex, or in other words, one which does not embody a carrying wheel, (as in the gang $C^3$ of Fig. 6) it is however to be understood that the gang standards and boxes here shown, are capable of receiving a long shaft carrying four or five disks, instead of the short shaft shown, with the carrying wheel, the latter and its spindle, being readily removable from its bearing. However the character of the gang may be varied, the inwardly projecting arm $s$, will serve the same purpose, its inner end being coupled to the horizontal link $l$, which in turn, is connected with a treadle lever as hereinbefore described, so that the control of the complex gang, or gangs, will be effected in the same manner, as in the machines before described, although the legs $a^3$, of the arched frame may be less widely separated. Whenever it may be desirable to reverse the disks in this complex gang, they can readily be detached from their shaft, and replaced in a reversed order, this only involving an appropriate rearrangement of the intervening collars. The complex gangs, or the gangs having only the soil working disks, when thus organized with the arched main frame, and coupled to the treadle levers as described, embody those portions of my invention which include the treadle levers and their link connections, and also those portions which include complex gangs, as well as those which relate to soil working bladed disks of varied diameter in the same gang.

Having thus described my invention, I claim as new and desire to secure by Letters Patent—

1. In a straddle row cultivator, the combination substantially as hereinbefore described, of an arched or main frame; a driver's seat; soil working disks organized with gang frames which are each flexibly connected with an appropriate leg of the main frame, and treadle levers suspended from the main frame and connected by links with the free ends of said gang frames.

2. In a straddle row cultivator, the combination substantially as hereinbefore described, of a main or arched frame; a driver's seat; soil working disks organized with gang frames which are flexibly connected with the legs of the main frame; and a pair of bell crank treadle levers suspended from the main frame and respectively connected to the free ends of the gang frames by means of rods or links.

3. In a straddle row cultivator, the combination substantially as hereinbefore described, of a main or arched frame; a driver's seat; soil working disks organized with gang frames, each of which is flexibly connected with an appropriate leg of the main frame; and a pair of treadle levers, operatively coupled to each other by means of a suspended rocking lever and links, and also respectively connected by links with the free ends of the gang frames, whereby on depressing either treadle lever, the end of its connected gang frame will be pulled forwardly, and the corresponding end of the other gang frame will be forced rearwardly.

4. In a straddle row cultivator, the combination substantially as hereinbefore described, of a main or arched frame; a driver's seat; soil working disks organized with gang frames each of which is flexibly connected with an appropriate leg of the main frame; a pair of treadle levers, operatively coupled together by means of a rocking lever and links, and respectively connected by means of links with the free ends of the gang frames; a hand lever which is accessible to an operator in the driver's seat; is provided with a locking plate and latch, and is coupled by means of a link to the rocking lever, whereby both treadle levers may be simultaneously operated, and both gang frames correspondingly forced or pulled into various positions by the manipulation of the hand lever, and maintained in such positions by the locking plate and latch, but leaving said gang frames free to be swung forwardly or backwardly by appropriate movements of the treadle levers.

5. In a straddle row cultivator, the combination with an arched main frame, and a driver's seat, of two gang frames, each having connected therewith a suitable number of soil working disks, and a carrying wheel, and each connected at one end to an appropriate leg of the main frame, and a treadle lever for each gang frame suspended from the main frame, and coupled by links to the free end of the gang frame for varying its inclination with reference to the line of draft.

6. In a straddle row cultivator, the combination substantially as hereinbefore described, of a main or arched frame; gang frames each having a suitable number of soil working disks, and each gang frame, flexibly coupled at one end to an appropriate leg of the main frame, and at its other end connected with the main frame by a vertically extensible link, for either maintaining the gangs in the same horizontal plane, or in vertically inclined positions.

7. In a straddle row cultivator, the combination substantially as hereinbefore described, of an arched frame, and complex gangs, flexibly united to the legs of the frame, and each embodying a suitable number of soil working disks and a carrying wheel.

8. In a straddle row cultivator, the combination in one gang frame substantially as hereinbefore described, of a carrying wheel at one end of the frame, and a suitable number of soil working disks at the other end, which are reversible with respect of the gang frame and said wheel, for enabling the disks to be operated for outwardly or inwardly displacing soil, without varying the position of the carrying wheel.

9. The combination substantially as hereinbefore described, of a suitable arched main frame, complex gangs in gang frames each flexibly united to a leg of the main frame, and each embodying a suitable number of soil working disks, and a vertically adjustable carrying wheel.

10. In a straddle row cultivator, the combination of an arched frame, bladed disk gangs, flexibly coupled to the legs of said frame, and having at their end or ends, disks which are smaller than the others, and treadle levers for swinging the gangs to and fro, substantially as described.

GEORGE MARSHALL CLARK.

Witnesses:
WELLINGTON H. WART,
WILLIAM H. BROWN.